US012261419B2

(12) United States Patent
Dozier et al.

(10) Patent No.: US 12,261,419 B2
(45) Date of Patent: Mar. 25, 2025

(54) PLUG-ON NEUTRAL DEVICE AND KIT

(71) Applicant: Schneider Electric USA, Inc., Andover, MA (US)

(72) Inventors: Steven Wayne Dozier, Andover, MA (US); Timothy Robert Faber, Andover, MA (US); David Keith Schroeder, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 254 days.

(21) Appl. No.: 18/014,972

(22) PCT Filed: Jul. 23, 2021

(86) PCT No.: PCT/US2021/043053
§ 371 (c)(1),
(2) Date: Jan. 6, 2023

(87) PCT Pub. No.: WO2022/020768
PCT Pub. Date: Jan. 27, 2022

(65) Prior Publication Data
US 2023/0261445 A1     Aug. 17, 2023

Related U.S. Application Data

(60) Provisional application No. 63/055,927, filed on Jul. 24, 2020, provisional application No. 63/055,938, filed on Jul. 24, 2020.

(51) Int. Cl.
*H02B 1/00* (2006.01)
*G05B 19/18* (2006.01)
(Continued)

(52) U.S. Cl.
CPC ............. *H02B 3/00* (2013.01); *G05B 19/188* (2013.01); *H01R 25/142* (2013.01); *H02B 1/04* (2013.01);
(Continued)

(58) Field of Classification Search
CPC . H02B 1/056; H02B 1/20; H02B 1/21; H02B 1/04; H02B 3/00; H01H 71/08; H01H 1/20; G05B 2219/31396; G05B 19/188
(Continued)

(56) References Cited

U.S. PATENT DOCUMENTS 7,508,653 B2    3/2009   Parlee
10,290,450 B1 *  5/2019   Betances Sansur .........................
                                                  H01H 71/0264

(Continued)

OTHER PUBLICATIONS

International Search Report and Written Opinion mailed Nov. 3, 2021 in International Application No. PCT/US2021/043053, 11 pages.

*Primary Examiner* — Mandeep S Buttar
(74) *Attorney, Agent, or Firm* — Troutman Pepper Locke LLP

(57) ABSTRACT

A plug-on neutral (PON) device includes a housing that defines a phase cooperation portion configured to physically cooperate with phase buses of a bus assembly. The phase cooperation portion is configured to be electrically isolated from the phase buses and stabilize the PON device when installed on the bus assembly. A neutral cooperation portion is configured to physically cooperate with the neutral bus and to physically stabilize the PON device when installed. An electrical connector disposed at the neutral cooperation portion is configured to electrically connect to the neutral bus at an external end and to electrically connect to a conductive current path at its internal end. A lug assembly has one or more conductive terminal lugs, each terminal lug (Continued)

configured to receive current from an external neutral source via an aperture in the lug end of the housing and to electrically connect to the current path.

17 Claims, 7 Drawing Sheets

(51) Int. Cl.
| | | |
|---|---|---|
| | *H01R 25/14* | (2006.01) |
| | *H02B 1/04* | (2006.01) |
| | *H02B 1/056* | (2006.01) |
| | *H02B 1/20* | (2006.01) |
| | *H02B 3/00* | (2006.01) |
| | *H01H 71/02* | (2006.01) |
| | *H01H 71/08* | (2006.01) |

(52) U.S. Cl.
CPC ............... *H02B 1/056* (2013.01); *H02B 1/20* (2013.01); *G05B 2219/31396* (2013.01); *H01H 2071/0278* (2013.01); *H01H 71/08* (2013.01)

(58) Field of Classification Search
USPC .......................................................... 361/627
See application file for complete search history.

(56) References Cited

U.S. PATENT DOCUMENTS

| | | | |
|---|---|---|---|
| 2011/0002089 A1* | 1/2011 | Sharp ..................... | H02B 1/056 |
| | | | 361/673 |
| 2016/0141134 A1* | 5/2016 | Pearson .................. | H01H 9/20 |
| | | | 200/50.21 |
| 2017/0033523 A1* | 2/2017 | Mittelstadt ............ | H01R 25/14 |
| 2017/0076896 A1* | 3/2017 | Robinson ............... | H01R 13/18 |
| 2017/0309431 A1 | 10/2017 | Hiremath et al. | |
| 2018/0331479 A1* | 11/2018 | Rehmer .................. | H02B 1/20 |
| 2018/0331513 A1* | 11/2018 | Rehmer ............... | H01R 25/142 |

\* cited by examiner

PLUG-ON NEUTRAL DEVICE AND KIT

TECHNICAL FIELD

The present disclosure relates to energy management, and more particularly, to a plug-on neutral device and kit of a modular switchboard or panelboard.

BACKGROUND

Conventional factory-assembled switchboards or panelboards typically come in a relatively limited number of configurations, and generally such factory assembled switchboards or panelboards require a significant amount of electrical buses, usually made of copper, which can be very expensive. A fully assembled switchboard or panelboard can also be very large and very heavy, which means shipping to the job site can be expensive and maneuvering to its final location at the job site can be very difficult. A completely assembled switchboard or panelboard can also be more difficult for installers to wire since some components block or restrict areas of the switchboard or panelboard where electrical connections must be made, such as toward the rear of the switchboard or panelboard.

Bus assemblies (also referred as a stack) for switchboards and panelboards can include parallel, adjacent, and spaced apart phase buses. Circuit breakers can be connected to the buses of the switchboard or panelboard via plug-on connectors that make a secure, electrical connection. The plug-on capability has provided certain advantages relative to other configurations, however even so, a neutral bus of a bus assembly is located separate from the phase buses of the bus assembly, such as off to the side or in a rear section of the switchboard or panelboard. In such configurations, neutral connections are off to the side or in the rear section, both of which make it difficult to access. A lack of clear access can reduce safety, such as by impeding access to a neutral disconnecting link or making such access hazardous, e.g., due to live bussing. In addition, the placement of neutral connections off to the side or in the rear section increases a length of wiring from a neutral source input conductor to the neutral bus of the bus assembly, requiring complex electrical joints that complicate satisfying requirements for regulatory certification.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a plug-on neutral (PON) device for coupling to a neutral bus of a bus assembly disposed interior to a switchboard or panelboard, the plug-on neutral device includes a housing defining a phase cooperation portion and a neutral cooperation portion. The phase cooperation portion is configured to physically cooperate with a phase portion of the bus assembly having one or more phase buses, stabilize the PON device when installed on the bus assembly, and be electrically isolated from the one or more phase buses when the PON device is installed on the bus assembly. The neutral cooperation portion is configured to physically cooperate with the neutral bus and to physically stabilize the PON device when installed on the bus assembly. THE PON device further includes an electrically conductive current path, an electrical connector, and a lug assembly. The current path has a bus end and a termination end. The electrical connector, having an external end and an internal end that is disposed internal to the housing, is disposed at the neutral cooperation portion. The external end is configured to electrically connect to the neutral bus, and the internal end and is configured to electrically connect to the bus end of the current path. The lug assembly has one or more electrically conductive terminal lugs, wherein each terminal lug is configured to receive current from an external neutral source via an aperture in the lug end of the housing and to electrically connect to the current path.

In one or more embodiments, the phase cooperation portion can be configured to be physically mounted to the one or more phase buses and/or to receive the one or more phase buses in one or more mouths of the phase cooperation portion.

In one or more embodiments, the neutral cooperation portion can be configured to be physically mounted to the neutral bus and/or to receive the neutral bus in a mouth of the neutral cooperation portion.

In one or more embodiments, the PON device can further include a current transformer (CT) configured to be disposed in relation to the current path, to sense current that flows through the current path, and output an output signal that corresponds to the sensing.

In one or more embodiments, the PON device can further include a plug having a first mating interface that is configured to mate with a second mating interface disposed external to the PON device.

In one or more embodiments, a mounting apparatus can be configured to secure the PON device to a support frame that is further configured to support breakers when mounted to the phase buses.

In one or more embodiments, the PON device can be configured to be installed on the bus assembly as a single module for establishing the electrical connection between the electrical connector and the neutral bar.

In one or more embodiments, a kit is provided, which can include the PON device, one or more fasteners for securing the PON device to the support frame, and instructions for assembly and/or installation of the PON device and/or providing information about the kit.

In a further aspect of the disclosure, a switchboard or panelboard assembly is provided. The switchboard or panelboard include a bus assembly disposed interior to a switchboard or panelboard, wherein the bus assembly includes a phase portion having one or more phase buses and a neutral bus adjacent to the phase portion. A PON is provided device for coupling to a neutral bus of the interior bus assembly when installed on the bus assembly.

In accordance with another aspect of the disclosure, a method is provided of installing a PON device on a neutral bus of a bus assembly disposed interior to a switchboard or panelboard. The method includes arranging the PON device for a phase cooperation portion of the PON device to physically cooperate with a phase portion of the bus assembly, wherein the phase portion including one or more phase buses. The phase cooperation portion is configured to stabilize the PON device when installed on the bus assembly and is configured to be electrically isolated from the one or more phase buses when the PON device is installed on the bus assembly. The method further includes arranging the PON device for a neutral cooperation portion of the PON device to physically cooperate with the neutral bus and to physically stabilize the PON device when installed on the bus assembly. The method further includes electrically connecting the neutral cooperation portion to the neutral bus, securing the PON device to a support frame of the assembly, and connecting a neutral source to the PON device, wherein the PON device is configured to provide a current path for current to flow between the neutral source and the neutral bus.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure provides a plug-on neutral (PON) device and kit for a switchboard or panelboard, including the I-Line™ series of switchboards or panelboards from Schneider Electric USA, Inc. that enables flexible and modular assembly and installation of the PON device with the switchboard or panelboard. The PON device can be assembled and/or installed using a single kit.

The PON device is configured to be installed on a bus assembly (also referred to as a stack) of the switchboard or panelboard, and in particular to a neutral bus of the bus assembly when the neutral bus is disposed next to the phase buses of the bus assembly. The PON device and kit are designed to reduce or minimize the amount of time and skill needed to perform this installation using ordinary mechanical assembly skills, without the need for particular electrical technician skills. The PON device is configured to be slid into position and secured to the bus assembly for electrically connecting to the neutral bus a source neutral input that is associated with source phase input of one or more grouped branch breakers that are grouped with the PON device. The PON device can be disposed adjacent or proximate the grouped branch breaker. With the board (meaning a switchboard or panelboard) configured to have the neutral bus located in a front area of the switchboard, next to the phase buses, associated source phase and neutral inputs are received by the PON device and adjacent branch breakers at the front of the board. This eliminates the need to provide source neutral inputs to the back of the board, which reduces the amount of cable that enters the board and minimizes electrical joints needed by the board.

In addition, multiple neutral circuits can be connected to one PON device 100 when ground fault monitoring by the PON device is not required. The limiting factors that limits the number of neutral circuits that can be connected to a single PON device 100 is the number of cable connections available on the PON device 100 and a requirement to not exceed an ampacity rating of the PON device 100. By servicing multiple neutral circuits, space occupied by the PON device 100 reduced or minimized.

Figure 1:
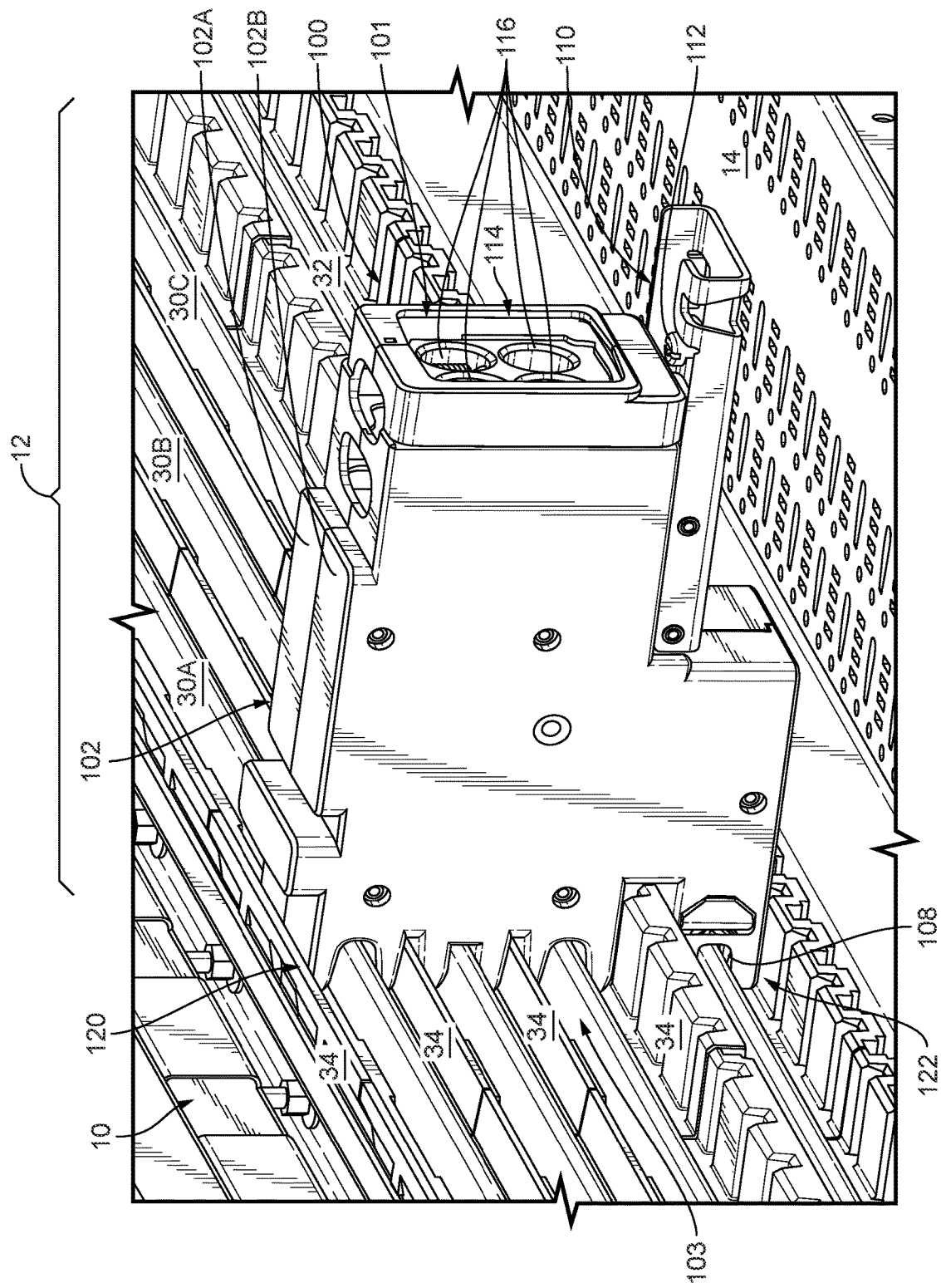
FIG. 1 shows a perspective, side view of an example plug-on neutral (PON) device disposed in an interior area of an example switchboard and installed on a bus assembly and breaker support frame disposed within the switchboard, in accordance with embodiments of the disclosure.
Figure 2:
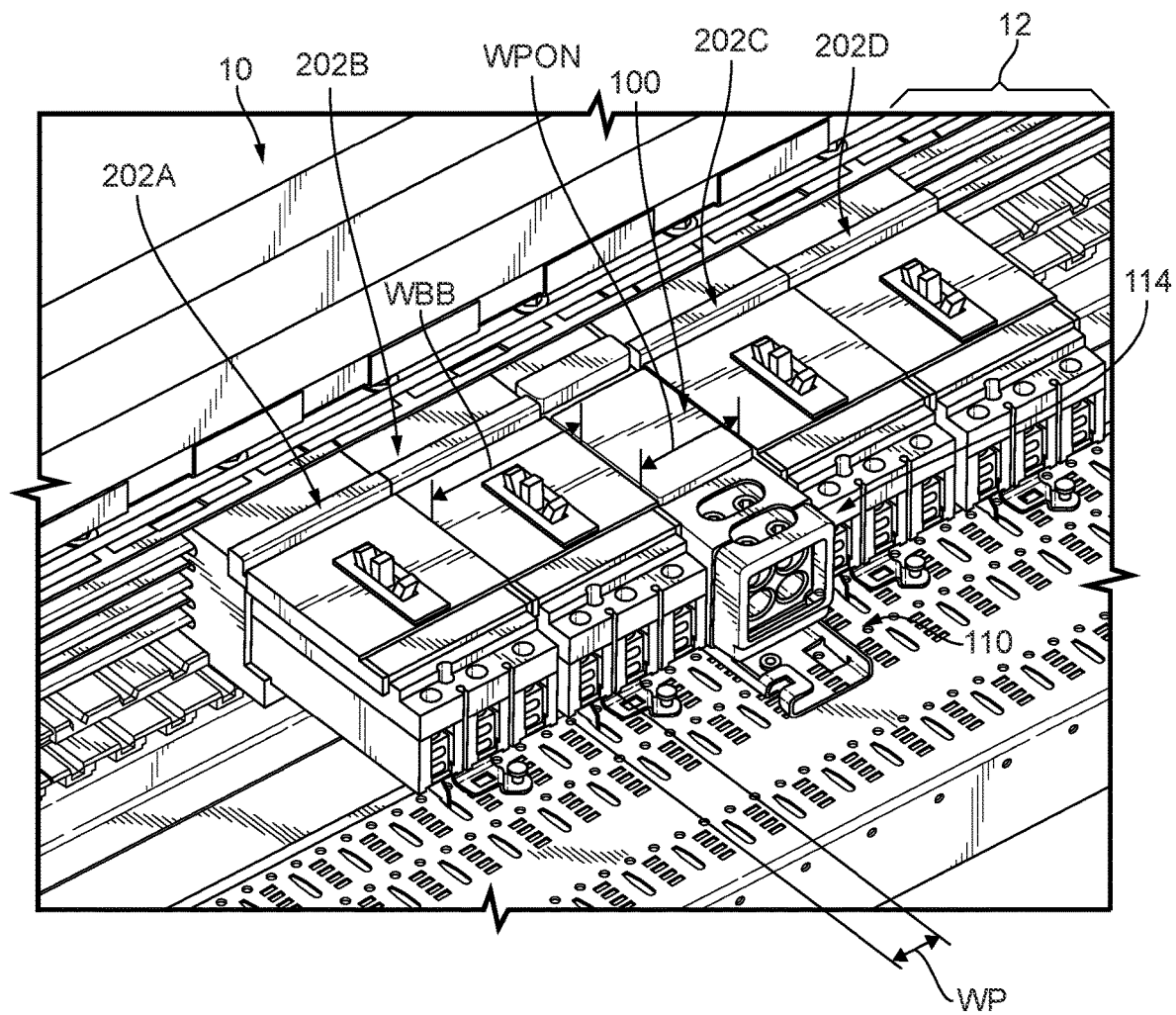
FIG. 2 shows a perspective, top view of a PON device and a group of adjacent branch breakers installed on a bus assembly of a switchboard, in accordance with embodiments of the disclosure.

With reference to FIGS. 1 and 2, shows respective perspective side and top views of an example PON device 100 disposed in an interior area of a switchboard 10, installed on a bus assembly 12 and breaker support frame 14 disposed within switchboard 10. Switchboard 10 shown in FIGS. 1 and 2 is shown as an example. The disclosure applies as well to a panelboard. All references and illustrations of a switchboard are equally relevant to a panelboard. Bus assembly 12 includes parallel phase and neutral buses, which in the example shown include phase buses 30A-30C (referred to collectively as phase buses 30) and neutral bus 32. Bus assembly 12, PON device 100, and branch breakers 202 are configured for plug-on connections in which PON device 100 and branch breakers 202 plug-on to neutral bus 32 and phase buses 30, respectively, for a secure, electrical connection, such as provided by the I-Line™ series of switchboards or panelboards from Schneider Electric USA, Inc. Phase buses 30, neutral bus 32, and breaker support frame 14 can all be parallel to one another and oriented vertically or horizontally and disposed interior to switchboard 10 at a front section of switchboard 10. A nonconductive material 34 is disposed in between each of the phase buses 30 as well as between phase bus 30C and neutral bus 32 for providing electrical insulation.

Figure 3:
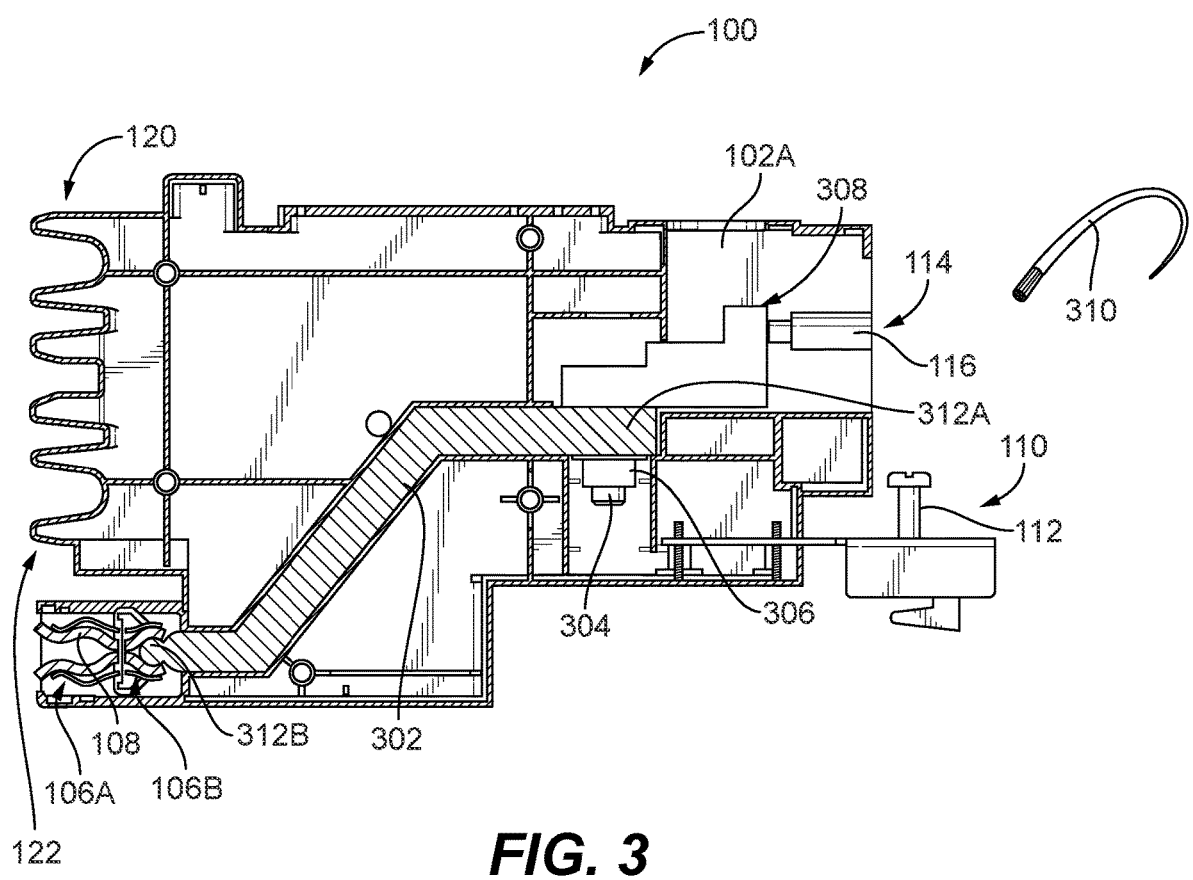
FIG. 3 shows a side view of an example PON device with a portion of its housing shown as transparent or removed, in accordance with embodiments of the disclosure.

With reference to FIGS. 1-3, PON device 100 has a housing 102 that includes a first side housing 102A and a second side housing 102B. FIG. 3 shows a side view of an example PON device 100 with second side housing 102B shown as transparent or removed. Housing 102 has a source end 101 and a bus end 103. Source end 101 is provided with a lugs assembly 114 having lug apertures 116, each lug aperture 116 configured to receive an external neutral source input conductor 310 that electrically connects to a terminal lug 308. Terminal lugs 308 can be secured interior to housing 102, e.g., by bolt 304 and nut 306, although the disclosure is not limited to a particular structure for securing terminal lugs 308 in PON device 100. Neutral source input conductor 310 can be received within lug apertures 116 and secured to one or more terminal lugs 308, e.g., with a wire binding screw (e.g., see 602 in FIG. 6 within aperture 116). Each terminal lug 304 is electrically conductive and configured to receive current from the source neutral input conductor 310, such as from a load connected to switchboard 10 or a line source providing electrical power to switchboard 10.

Bus end 103 of housing 102 is provided with a phase cooperation portion 120 and a neutral cooperation portion 122. Phase cooperation portion 120 is configured to physically cooperate with phase buses 30A-30C and to physically stabilize PON device 100 when installed on the bus assembly 12. Phase cooperation portion 120 can have respective mouths, each mouth configured to receive one of the phase buses 30. Neutral cooperation portion 122 is configured to physically cooperate with neutral bus 32 and to physically stabilize PON device 100 when installed on the bus assembly 12. Neutral cooperation portion 122 can have a mouth configured to receive the neutral bus 32.

In addition, neutral cooperation portion 122 is provided with an electrical connector 108 which is electrically conductive and configured to electrically connect to neutral bus 32. In addition, electrical connector 108 electrically connects to a current path 302, wherein current path 302 is electrically connected between electrical connector 108 and terminal lugs 308.

Current path 302 is an electrically conductive connector. Current path 302 can be elongated, having a first end 312A that electrically connects to terminal lugs 308 and a second end 312B that is configured to physically cooperate with and electrically connect to internal end 106B of electrical connector 108.

Electrical connector 108 has an external end 106A and an internal end 106B, the external end being configured to electrically connect to the neutral bus, the internal end being configured to electrically connect to current path 302.

In the example shown, external end 106A includes a spring jaw connector that provides a plug-on electrical connection to neutral bus 32 when neutral bus 32 is forced into a gap between jaws of the spring jaws. External end 106A of electrical connector 108 is not limited to being configured as a spring jaw connector, and can have other types of configurations that can plug-on and establish an electrical connection, such as a bolted connection.

Furthermore, in the example shown, internal end 106B includes a second spring jaw connector that provides a plug-on electrical connection to current path 302 when force is applied to force second end 312B of current path 302 into a gap between jaws of the second spring jaws. Second end 312B can be configured with a circular profile, such as a circular bulb that fits into the gap between jaws of internal end 106B, which enables internal end 106B to swivel to compensate for any misalignment. Internal end 106B of electrical connector 108 is not limited to being configured as a spring jaw connector, and can have other types of configurations that can plug-on and establish an electrical connection, such as a bolted connection.

PON device 100 further includes a mounting apparatus 110 that is configured to secure PON device 100 in position for maintaining the electrical connection to neutral bus 32. In the example shown, mounting apparatus 110 secures PON device 100 to breaker support frame 14. Mounting apparatus 110 can be configured with holes for receiving assembly hardware 112 (e.g., screws, washers, nuts, bolts, etc., which can be provided with a kit.

Figure 4:
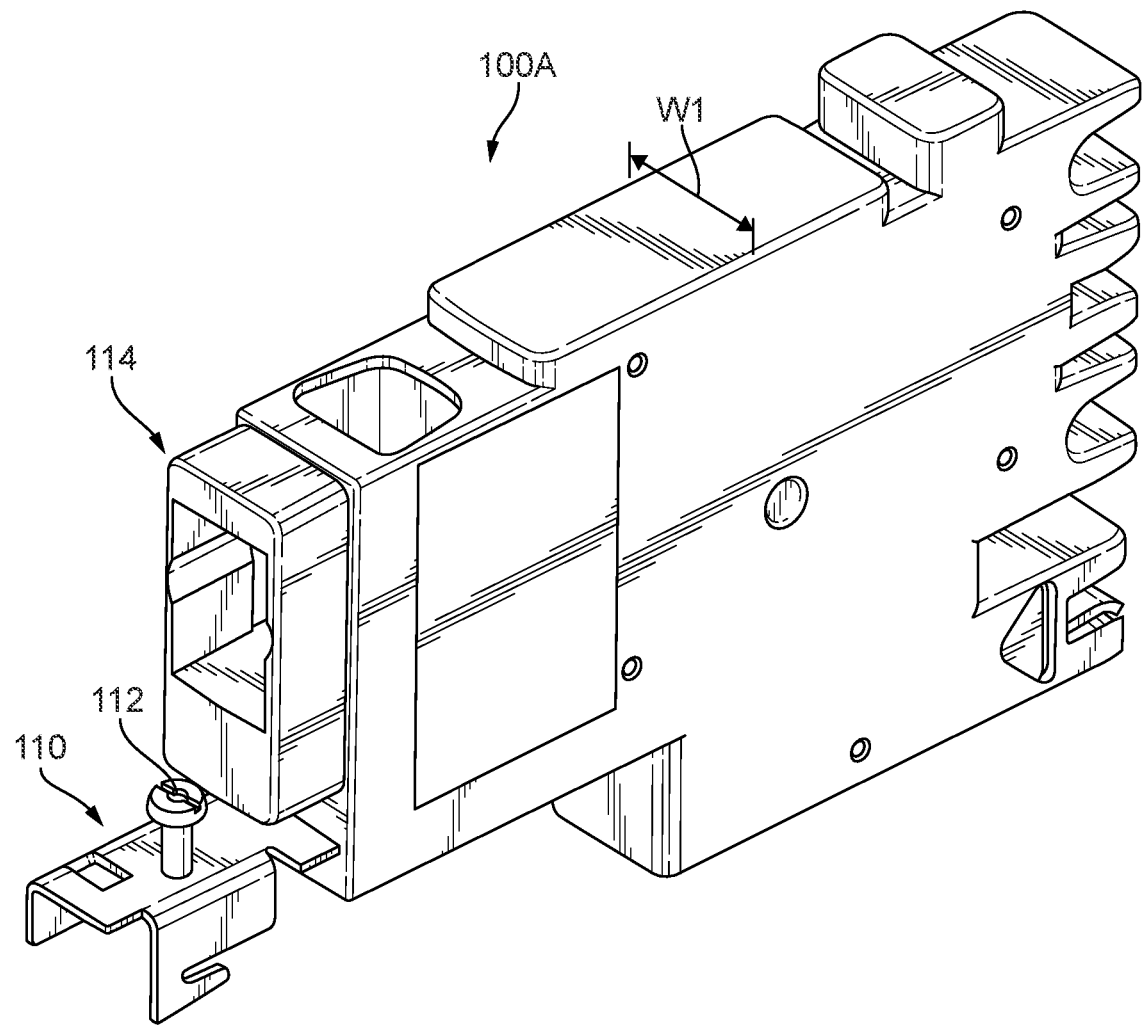
FIG. 4 shows a perspective, opposing-side view of an embodiment of an example PON device, in accordance with embodiments of the disclosure.
Figure 5:
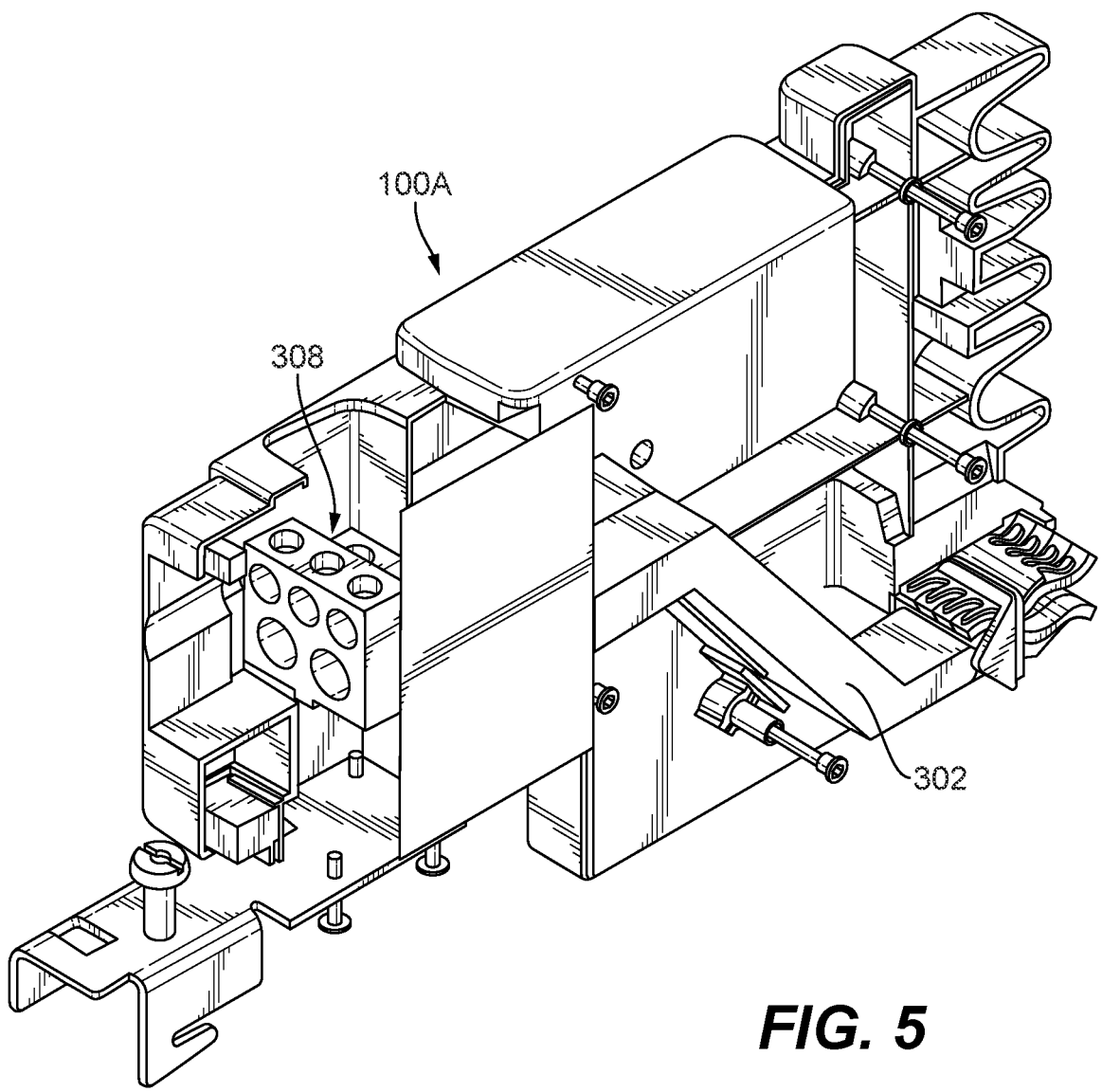
FIG. 5 shows a perspective, opposing-side view of the PON device shown in FIG. 4, with portions of its housing shown as transparent or removed, in accordance with embodiments of the disclosure.
Figure 6:
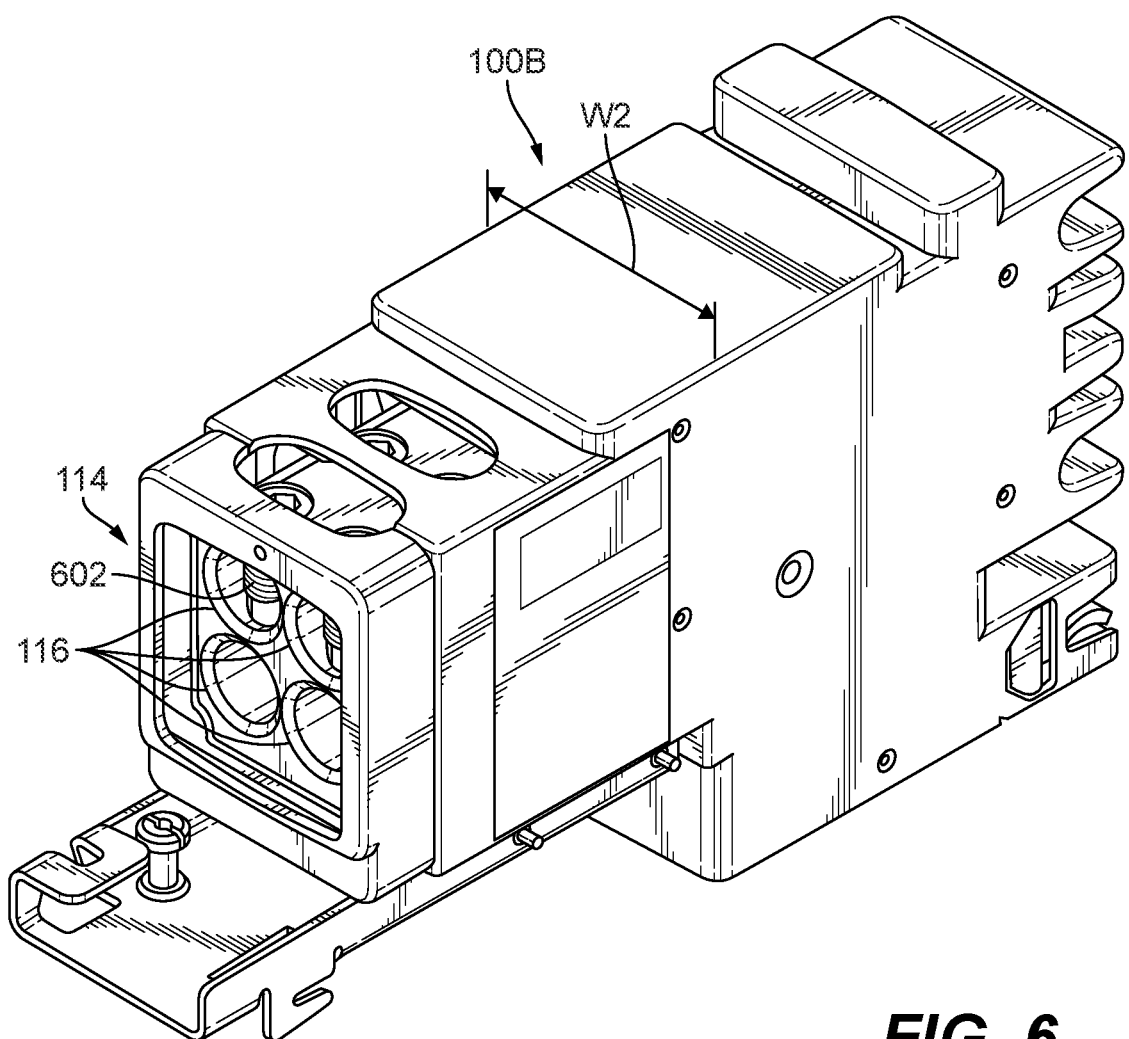
FIG. 6 shows a perspective, opposing-side view of an embodiment of an example PON device, in accordance with embodiments of the disclosure.
Figure 7:
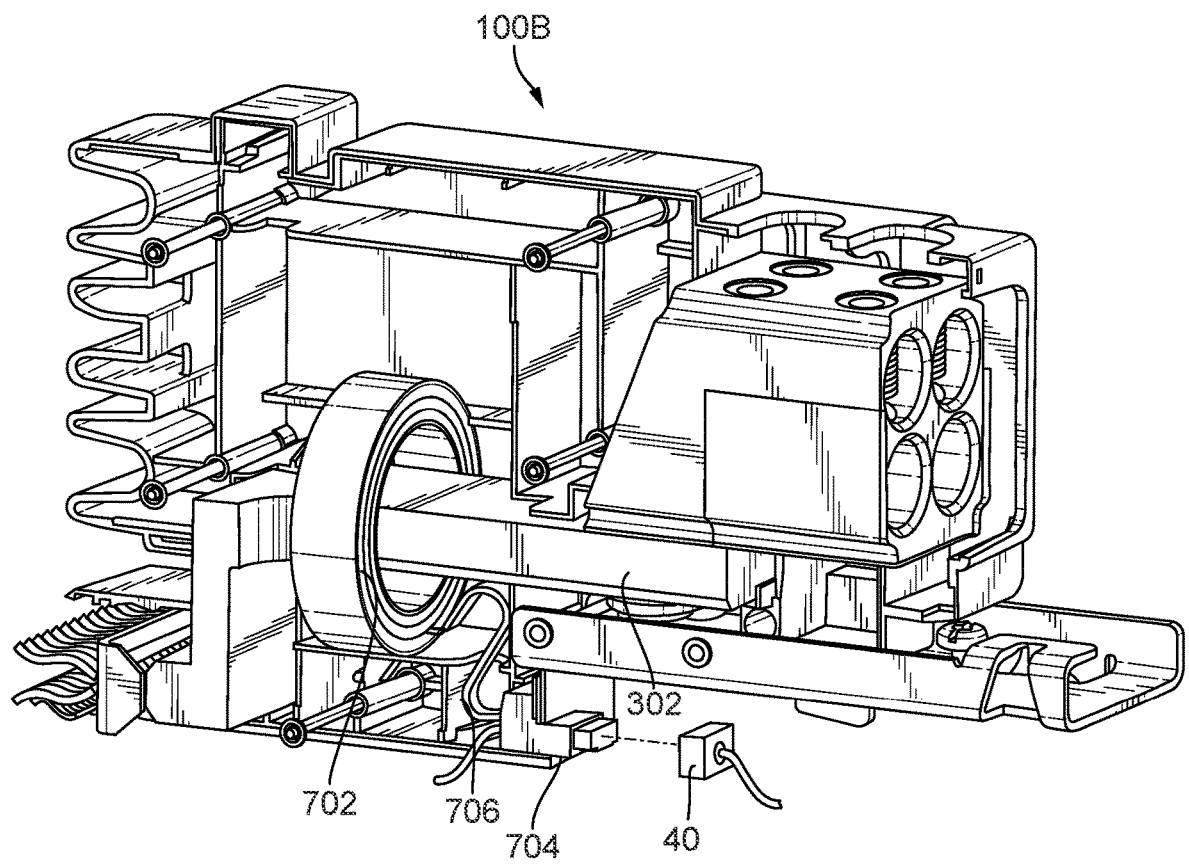
FIG. 7 shows a perspective, side view of the PON device shown in FIG. 6, with portions of its housing shown as transparent or removed, in accordance with embodiments of the disclosure.

The kit can include the PON device 100, hardware 112 (e.g., correct number, diameter, length, thread pitch and gauge of hardware 112), and access to installation instructions (e.g., a list of contents of the kit, installation instructions, and/or augmented reality to show an assembler, in an approved and certified sequence, where each component of the PON device is to be installed). With reference to FIG. 2, PON device 100 and a group of adjacent branch breakers 202A-202D (referred to collectively as branch breakers 202) installed on bus assembly 12 is shown. PON device 100 and one or two of the adjacent branch breakers 202 can be in physical contact along at least a portion of their inner surfaces or along their entire inner surfaces. A width WPON of PON device 100 is smaller than a width of WBB of branch breakers 202. In one or more embodiments, PON device 100 is a low-ampacity device (as shown in FIGS. 4 and 5), wherein WPON is substantially the same as a width WP that corresponds to a width of a portion of one of branch breakers 202 that is used to receive one phase source input conductor. In this embodiment, a ratio of WPON to WBB can be substantially 1:3. In one or more embodiments, PON device 100 is a high-ampacity device (as shown in FIGS. 6 and 7), wherein WPON is substantially the same as a 2(WP), meaning a width of a portion of one of branch breakers 202 that is used to receive two phase source input conductors. In this embodiment, a ratio of WPON to WBB can be substantially 2:3.

In the embodiment shown in FIG. 2, PON device 100 can service the neutral source input conductors (e.g., neutral input conductors 310 shown in FIG. 3) that correspond to the phase source input conductors serviced by all of branch breakers 202A-202D. Here, the width of branch breakers 202A-202D is 12(WP) and the width PON device 100 is 2(WP), wherein PON device 100 occupies only ⅙ the space along bus assembly 12 that is occupied by the group of branch breakers 202 for which it services neutral input conductors 310. Since PON device 100 is located near the front of switchboard 10, it is easily accessible for installation and maintenance, and the need to feed neutral input conductors 310 to a rear portion of switchboard 10 is eliminated. This minimal increase of space occupied by PON device 100 provides for a large reduction of cabling and reduces an amount and complexity of electrical joints.

With reference to FIGS. 4 and 5, an embodiment of an example low-ampacity PON device 100A is shown. FIG. 4 shows a perspective, opposing-side view of PON device 100A and FIG. 5 shows a perspective, opposing-side view with portions of first housing side 102A shown as transparent or removed. PON device 100A has up to a first quantity of lug apertures 116 in lugs assembly 114 for receiving inputs from the first quantity of neutral source input conductors 310 (shown in FIG. 3), wherein each neutral source input conductor 310 corresponds to one set of phase source input conductors (not shown), wherein each set of phase source input conductors is connected to one branch breaker 202 (shown in FIG. 2) being serviced by PON device 100A in a one-to-one correspondence. PON device 100A, when configured based on the low-ampacity embodiment, has ampacity that is limited to below a first threshold, such as 570 amps. PON device 100A can thus service a group of branch breakers 202 that includes up to the first quantity of branch breakers 202. In accordance with good practice and/or compliance with regulations, current monitoring is not required.

In the examples shown, the low-ampacity PON device 100A can receive inputs from six (limited only by the number of connections for receiving inputs and ampacity of PON device 100A) neutral source input conductors 310 that receive phase currents from phase source input conductors that, in combination, do not exceed the first threshold. In this example, PON device 100A has a width W1. In other words, the low-ampacity PON devices 100A can service a group of six branch breakers 202 that in combination have an ampacity that does not exceed the first threshold. In other embodiments, low-ampacity PON device 100A can service a group of any number of branch breakers 202, wherein the ampacity of the group of branch breakers 202 does not exceed the first threshold.

With reference to FIGS. 6 and 7, an embodiment of an example high-ampacity PON device 100B is shown. FIG. 6 shows a perspective, opposing-side view of PON device 100B and FIG. 7 shows a perspective, side view with portions of second housing side 102B shown as transparent or removed. PON device 100B has up to a second quantity of lug apertures 116 in lugs assembly 114 for receiving inputs from up to the second quantity of neutral source input conductors 310 (shown in FIG. 3), wherein each neutral source input conductors 310 corresponds to one set of phase source input conductors, wherein each set of phase source input conductors is connected to one branch breaker 202 one-to-one correspondence. PON device 100B, when configured based on the high-ampacity embodiment, has ampacity that is limited to below a second threshold, such as 1200 amps. In accordance with good practice and/or compliance with regulations, current monitoring is required, and it is required to provide a signal when a current threshold is exceeded to provide for the ability to trip the circuit, e.g., by opening the circuit to prevent current flow. Accordingly, as shown in FIG. 7, a current transformer (CT) 702 is provided for monitoring current through current path 302 and outputting an output signal that indicates the measured current or when the measured current has exceeded a predetermined threshold. CT 702 can be placed around current path 302. In the example shown, without limitation to a particular configuration, CT 702 is shaped as a toroid that surrounds current path 302. The output signal can be output, for example, to a plug 704 via one or more wires 706 that connect CT 702 to plug 704.

Plug 704 or wire 706 can be directly connected to an adjacent or nearby branch breaker, such as branch breakers 202 shown in FIG. 2. Wire 706 can be routed under a cover of branch breaker 202 and be directly connected to a trip unit of the branch breaker 202. In one or more embodiments, branch breaker 202 can include a mating plug electrically coupled to (e.g., wired to) a ground fault detection circuit in branch breaker 202. Plug 704 can be connected to the mating plug of branch breaker 202 (or another mating plug external to PON 100) to provide the output signal from CT 702 to the ground fault detection circuit of branch breaker 202.

In the examples shown, the high-ampacity PON device 100B can receive inputs from up to four (limited only by the number of connections for receiving inputs and ampacity of PON device 100B) neutral source input conductors 310 that receive phase currents from phase source input conductors that, in combination, do not exceed the second threshold. In this example, PON device 100B has a width W2, wherein W2 is substantially twice as long as W1. In other words, the high-ampacity PON devoice 100B can service a group of four branch breakers 202 (as shown in FIG. 2) that in combination have an ampacity that does not exceed the second threshold. In other embodiments, high-ampacity PON device 100B can service a group of any number of branch breakers 202, wherein the ampacity of the group of branch breakers 202 does not exceed the second threshold.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A plug-on neutral (PON) device for coupling to a neutral bus of a bus assembly disposed interior to a switchboard or panelboard, the plug-on neutral device comprising:
    a housing defining:
        a phase cooperation portion configured to physically cooperate with a phase portion of the bus assembly, the phase portion including one or more phase buses, the phase cooperation portion configured to stabilize the PON device when installed on the bus assembly, wherein the phase cooperation portion is configured to be electrically isolated from the one or more phase buses when the PON device is installed on the bus assembly; and
        a neutral cooperation portion configured to physically cooperate with the neutral bus and to physically stabilize the PON device when installed on the bus assembly;
    a current path, the current path being conductive and having a bus end and a termination end;
    an electrical connector disposed at the neutral cooperation portion, the electrical connector having an external end and an internal end, the external end being configured to electrically connect to the neutral bus, the internal end disposed internal to the housing and configured to electrically connect to the bus end of the current path; and
    a lug assembly having one or more terminal lugs, each terminal lug configured to receive current from an external neutral source via an aperture in the lug end of the housing, each terminal lug being electrically conductive and configured to electrically connect to the current path.

2. The PON device of claim 1, wherein the phase cooperation portion is configured to be physically mounted to the one or more phase buses and/or to receive the one or more phase buses in one or more mouths of the phase cooperation portion.

3. The PON device of claim 1, wherein the neutral cooperation portion is configured to be physically mounted to the neutral bus and/or to receive the neutral bus in a mouth of the neutral cooperation portion.

4. The PON device of claim 1, further comprising a current transformer (CT) configured to be disposed in relation to the current path, to sense current that flows through the current path, and output an output signal that corresponds to the sensing.

5. The PON device of claim 4, further comprising a plug having a first mating interface that is configured to mate with a second mating interface disposed external to the PON device.

6. The PON device of claim 1, further comprising a mounting apparatus configured to secure the PON device to a support frame that is further configured to support breakers when mounted to the phase buses.

7. The PON device of claim 1, wherein the PON device is configured to be installed on the bus assembly as a single module for establishing the electrical connection between the electrical connector and the neutral bar.

8. A kit comprising:
the PON device as recited in claim 1,
one or more fasteners for securing the PON device to the support frame; and
instructions for assembly and/or installation of the PON device and/or providing information about the kit.

9. A switchboard or panelboard assembly comprising:
a bus assembly disposed interior to a switchboard or panelboard, the bus assembly including a phase portion having one or more phase buses and a neutral bus adjacent to the phase portion; and
a plug-on neutral (PON) device for coupling to the neutral bus of the bus assembly when installed on the bus assembly, the PON device comprising:
a housing defining:
a phase cooperation portion configured to physically cooperate with the phase portion of the bus assembly and stabilize the PON device when installed on the bus assembly, wherein the phase cooperation portion is configured to be electrically isolated from the one or more phase buses when installed on the bus assembly; and
a neutral cooperation portion configured to physically cooperate with the neutral bus and to physically stabilize the PON device when installed on the bus assembly;
a current path, the current path being conductive and having a bus end and a termination end;
an electrical connector disposed at the neutral cooperation portion, the electrical connector having an external end and an internal end, the external end being configured to electrically connect to the neutral bus, the internal end disposed internal to the housing and configured to electrically connect to the bus end of the current path; and
a lug assembly having one or more terminal lugs, each terminal lug configured to receive current from an external neutral source via an aperture in the lug end of the housing, each terminal lug being electrically conductive and configured to electrically connect to the current path.

10. The switchboard or panelboard assembly of claim 9, further comprising at least one branch breaker configured to be installed on the bus assembly and mount to the phase portion for electrically connecting to the one or more phase bars and to receive an external phase source that corresponds to the external neutral source associated with one of the terminal lugs of the PON device.

11. The switchboard or panelboard assembly of claim 10, wherein the at least one branch breaker is configured to be installed on the bus assembly adjacent to the PON device.

12. The switchboard or panelboard assembly of claim 10, wherein the at least one branch breaker includes multiple branch breakers, and the PON device is configured to be installed on the bus assembly adjacent to one or two of the multiple branch breakers.

13. The switchboard or panelboard assembly of claim 9, wherein the PON device further comprises:
a current transformer (CT) disposed in relation to the current path and configured to sense current that flows through the current path and output an output signal that corresponds to the sensing; and
a plug having a first mating interface that is configured to mate with a second mating interface disposed external to the PON device.

14. The switchboard assembly of claim 9, wherein each of the one or more branch breakers has a phase portion having a phase terminal lug for receiving one of the one or more phase source, each phase portion having a width, wherein a width of the PON device is no greater than the width of any of the phase portions.

15. The switchboard or panelboard assembly of claim 9, wherein the phase cooperation portion is configured to be physically mounted to the one or more phase buses and/or to receive the one or more phase buses in one or more mouths of the phase cooperation portion, and wherein the neutral cooperation portion is configured to be physically mounted to the neutral bus and/or to receive the neutral bus in a mouth of the neutral cooperation portion.

16. The switchboard or panelboard assembly of claim 9, wherein the bus assembly includes a support frame and the PON device is configured to be mounted to the support frame when the PON device is installed on the bus assembly.

17. A method of installing a plug-on neutral (PON) device on a neutral bus of a bus assembly disposed interior to a switchboard or panelboard, the method comprising:
arranging the PON device for a phase cooperation portion of the PON device to physically cooperate with a phase portion of the bus assembly, the phase portion including one or more phase buses, the phase cooperation portion being configured to stabilize the PON device when installed on the bus assembly and to be electrically isolated from the one or more phase buses when the PON device is installed on the bus assembly;
arranging the PON device for a neutral cooperation portion to physically cooperate with the neutral bus and to physically stabilize the PON device when installed on the bus assembly;
electrically connecting the neutral cooperation portion to the neutral bus;
securing the PON device to a support frame of the assembly; and
connecting a neutral source to the PON device, wherein the PON device is configured to provide a current path for current to flow between the neutral source and the neutral bus.

\* \* \* \* \*